United States Patent
Kahlen et al.

(10) Patent No.: US 12,163,011 B2
(45) Date of Patent: *Dec. 10, 2024

(54) UPGRADED RECYCLED POLYETHYLENE POLYPROPYLENE BLEND

(71) Applicant: BOREALIS AG, Vienna (AT)

(72) Inventors: Susanne Kahlen, Linz (AT); Hermann Braun, Linz (AT); Yi Liu, Linz (AT); Markus Gahleitner, Linz (AT)

(73) Assignee: BOREALIS AG, Vienna (AT)

( * ) Notice: Subject to any disclaimer, the term of this patent is extended or adjusted under 35 U.S.C. 154(b) by 722 days.

This patent is subject to a terminal disclaimer.

(21) Appl. No.: 17/284,952

(22) PCT Filed: Oct. 29, 2019

(86) PCT No.: PCT/EP2019/079459
§ 371 (c)(1),
(2) Date: Apr. 13, 2021

(87) PCT Pub. No.: WO2020/089196
PCT Pub. Date: May 7, 2020

(65) Prior Publication Data
US 2022/0127439 A1    Apr. 28, 2022

(30) Foreign Application Priority Data

Oct. 31, 2018    (EP) .................... 18203678

(51) Int. Cl.
*C08L 23/04*   (2006.01)
*C08K 3/34*    (2006.01)
*C08K 5/01*    (2006.01)
*C08L 23/10*   (2006.01)

(52) U.S. Cl.
CPC ............. *C08L 23/04* (2013.01); *C08K 3/34* (2013.01); *C08K 5/01* (2013.01); *C08L 23/10* (2013.01); *C08L 2205/025* (2013.01); *C08L 2207/20* (2013.01)

(58) Field of Classification Search
CPC ....... C08K 3/34; C08K 5/01; C08L 2205/025; C08L 2205/03; C08L 2207/20; C08L 23/04; C08L 23/0815; C08L 23/10
See application file for complete search history.

(56) References Cited

U.S. PATENT DOCUMENTS

| | | |
|---|---|---|
| 2011/0105667 A1 | 5/2011 | Brenner et al. |
| 2018/0258266 A1 | 9/2018 | Hu et al. |

FOREIGN PATENT DOCUMENTS

| | | |
|---|---|---|
| CN | 101365733 A | 2/2009 |
| CN | 106232707 A | 12/2016 |
| CN | 107849319 A | 3/2018 |
| CN | 107922686 A | 4/2018 |
| CN | 108025826 A | 5/2018 |
| TW | 201710352 A | 3/2017 |
| WO | 2015169690 A1 | 11/2015 |
| WO | 2017044533 A1 | 3/2017 |
| WO | WO-2017060139 A1 * | 4/2017 ............. C08F 10/06 |

OTHER PUBLICATIONS

Data Sheet for ENGAGE 8100, available from DOW Chemical Company; retrieved from the Internet Mar. 11, 2024 (Year: 2024).*
Applicant: Borealis AG; "Upgraded Recycled Polyethylene Polypropylene Blend"; Chinese Application No. 201980066760.3; Chinese Office Action dated Nov. 28, 2022; 17 pgs.
Applicant: Borealis AG; European Application No. 19794563.7; European Office Action, dated Oct. 14, 2022; 7 pgs.
Busico, Vincenzo, et al., "Alk-1-Ene Polymerization in the Presence of a Monocyclopentadienyl Zirconium(IV) Acetamidinate Catalyst: Microstructural and Mechanistic Insights", Macromol. Rapid Commun. 2007, 28, 1128-1137.
Cheng, et al., "13C NMR Analysis of Ethylene-Propylene Rubbers", Macromolecules 17, 1984, 1950-1955.
Singh, Gurmeet, et al., "Triad Sequence Determination of Ethylene-Propylene Copolymers—Application of Quantitative 13C NMR", Polymer Testing 28 (2009) 475-479.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Applicant: Borealis AG; Upgraded Recycled Polyethylene Polypropylene Blend; European Application No. 18203678; Extended European Search Report, dated Apr. 2, 2019; 8 pgs.

(Continued)

*Primary Examiner* — Frances Tischler
(74) *Attorney, Agent, or Firm* — Tarolli, Sundheim, Covell & Tummino LLP

(57) ABSTRACT

A polyethylene-polypropylene composition obtainable by blending a) 80 to 97 wt.-% of a blend (A) comprising A-1) polypropylene and A-2) polyethylene, wherein the weight ratio of polypropylene to polyethylene is from 3:7 to 7:3, and wherein blend (A) is a recycled material, which is recovered from a waste plastic material derived from post-consumer and/or industrial waste; and b) 3 to 20 wt.-% of a compatibilizer (B) being a C2C8 plastomer, having—a DSC melting point of below 75° C. (ISO11357); —an $MFR_2$ (ISO1133, 2.16 kg load at 190° C.) of equal or below 1.5 g/10 min; and—a density of equal or lower than 885 kg/m³ (ISO1183), wherein the ratio of $MFR_2$ (blend (A) (ISO1133, 2.16 kg load at 230° C.)/$MFR_2$ (compatibilizer (B) (ISO1133, 2.16 kg load at 190° C.), is in the range 3.0 to 15; and c) 0 to 1.0 wt.-% of a stabilizer or mixture of stabilizers.

10 Claims, 2 Drawing Sheets

(56) References Cited

OTHER PUBLICATIONS

Seno Jose, et al.; "Mechanical and dynamic mechanical properties of polyolefin blends: effect of blend ratio and copolymer monomer fraction on the compatibilisation efficiency of random copolymers"; J Polym Res (2013) 20:303; Oct. 10, 2013; 14 pgs.; DOI 10.1007/s10965-013-0303-5.
Taiwan Office Action for Taiwan Application No. 108139035; Jun. 9, 2020; 9 pgs.

* cited by examiner

UPGRADED RECYCLED POLYETHYLENE POLYPROPYLENE BLEND

FIELD OF INVENTION

The present invention relates to upgraded recycled blends comprising predominantly polyethylene and polypropylene.

BACKGROUND

The use of recycled materials, which are derived from a wide variety of sources is a must in the field of polyolefins. However, the recycling streams available all suffer from limited mechanical properties not allowing commercially attractive end uses. Various expensive booster polymers have been suggested for upgrading recycling streams rendering the recycling as such uneconomical. For this reason, there is at the moment very limited market for recycled blends. In blends comprising predominantly polyethylene and polypropylene, it is relatively easy to achieve higher impact strength through the addition of elastomers acting as compatibilizers like conventional ethylene-propylene rubbers or EPDM, see Jose et al. J. Polym. Res. 20 (2013) 303. However, such addition will limit the stiffness of the resulting compositions. Moreover, many of these elastomers are only available as high molecular weight versions and/or in non-pelletized form, the latter requiring specific mixing equipment. WO 2015/169690 A1 suggests the incorporation of heterophasic ethylene-propylene copolymers (HECOs) comprising ethylene-octene-copolymers, which are commercially available, i.a. from Borealis Plastomers (NL) under the tradename Queo®, from DOW Chemical Corp (USA) under the tradename Engage®, or from ENI SpA (IT).

However, the use of arbitrary heterophasic ethylene-propylene copolymers (HECOs) is not yielding good results, particularly with respect to stiffness. It was commonly believed that the limited stiffness could only be overcome by using plastomers having block copolymer nature such as provided by Dow Chemical as Dow Infuse OBC or Intune OBC plastomers. For example, INTUNE™ polypropylene-based OBCs (PP-OBCs) have been designed as compatibilizers rather than elastomers. They contain propylene-rich blocks compatible with polypropylene and ethylene-rich blocks compatible with polyethylene.

It is readily understandable that the block copolymer introduces the options of having certain domains of higher stiffness and thereby overall increased stiffness. However, plastomers with block copolymer natures, which is easily detectable by NMR, have the disadvantage of being relatively expensive.

Therefore there was a deeply felt need of having a good balance of stiffness and good impact in recycled polyethylene polypropylene blends.

Particularly there was a deeply felt need for having an upgraded composition with a Charpy notched impact strength (ISO179 A, RT) of at least 8.0 kJ/m$^2$ and simultaneously at least 700 MPa tensile modulus (ISO527-2), ideally at least 750 MPa for a 95 wt.-% recycling blend+5 wt.-% plastomer mixture and further an upgraded composition with a Charpy notched impact strength (ISO179 A, RT) of at least 25 kJ/m$^2$ and simultaneously at least 650 MPa tensile modulus (ISO527-2) for a 90 wt.-% recycling blend+10 wt.-% plastomer mixture.

The present invention is based on the surprising finding that there is no need for sophisticated plastomers having block copolymer structure as long as a C2C8 plastomer having an MFR of 1.5 g/10 min or lower, a density equal or below 885 kg/m$^3$ is used and the ratio of the MFR of the recycling blend versus the MFR of the compatibilizer is in the range of 3.0 to 15.

SUMMARY OF THE INVENTION

The present invention insofar is directed to
a polyethylene-polypropylene composition obtainable by blending
 a) 80 to 97 wt.-% of a blend (A) comprising
  A-1) polypropylene and
  A-2) polyethylene,
  wherein the weight ratio of polypropylene to polyethylene is from 3:7 to 7:3, and
  wherein blend (A) is a recycled material, which is recovered from a waste plastic material derived from post-consumer and/or industrial waste;
and
 b) 3 to 20 wt.-% of a compatibilizer (B) being a $C_2C_8$ plastomer,
 having
  a DSC melting point of below 75° C. (ISO11357);
  an MFR$_2$ (ISO1133, 2.16 kg load at 190° C.) of equal or below 1.5 g/10 min; and
  a density of equal or lower than 885 kg/m$^3$ (ISO1183),
 wherein the ratio of MFR$_2$ (blend (A) (ISO1133, 2.16 kg load at 230° C.)/MFR$_2$ (compatibilizer (B) (ISO1133, 2.16 kg load at 190° C.), is in the range 3.0 to 15; and
 c) 0 to 1.0 wt.-% of a stabilizer or mixture of stabilizers.

The present invention further provides a talc filled composition consisting of 0.1 to 20.0 wt.-% talc and the polyethylene-polypropylene composition as described herein.

In a further aspect, the present invention is concerned with an article comprising the polyethylene-polypropylene composition or the talc filled composition according to the present invention.

In a further aspect, the present invention is concerned with a process for providing a polyethylene-polypropylene composition according to the present invention the process comprising the steps of:
 a) providing blend (A) comprising polypropylene and polyethylene in a ratio of 3:7 to 7:3 in amount of at least 80 wt.-%, based on the total weight of the polyethylene-polypropylene composition,
 b) providing a compatibilizer (B) in an amount from 3 to 20 wt.-%, based on the total weight of the polyethylene-polypropylene composition, whereby compatibilizer (B) is a $C_2C_8$ plastomer, having
  a DSC melting point of below 75° C. (ISO11357);
  an MFR$_2$ (ISO1133, 2.16 kg load at 190° C.) of equal or below 1.5 g/10 min; and
  a density of equal or lower than 885 kg/m$^3$ (ISO1183);
 wherein the ratio of MFR$_2$ (blend (A) (ISO1133, 2.16 kg load at 230° C.)/MFR$_2$ (compatibilizer (B) (ISO1133, 2.16 kg load at 190° C.), is in the range 3.0 to 15;
 c) melting and mixing the blend of blend (A) and the compatibilizer (B) in the presence of 0 to 1.0 wt.-% of a stabilizer or a mixture of stabilizers, and
 d) optionally pelletizing.

In yet a further aspect, the present invention concerns the use of a compatibilizer (B) being a $C_2C_8$ plastomer, having
- a DSC melting point of below 75° C. (ISO11357);
- an $MFR_2$ (ISO1133, 2.16 kg load at 190° C.) of equal or below 1.5 g/10 min; and
- a density of equal or lower than 885 kg/m³ (ISO1183), for improving the impact-stiffness balance of a blend (A) comprising
- A-1) polypropylene and
- A-2) polyethylene, wherein the weight ratio of polypropylene to polyethylene is from 3:7 to 7:3, and wherein blend (A) is a recycled material, which is recovered from a waste plastic material derived from post-consumer and/or industrial waste; and wherein the ratio of $MFR_2$ (blend (A) (ISO1133, 2.16 kg load at 230° C.)/$MFR_2$ (compatibilizer (B) (ISO1133, 2.16 kg load at 190° C.), is in the range 3.0 to 15

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below.

Unless clearly indicated otherwise, use of the terms "a," "an," and the like refers to one or more.

For the purposes of the present description and of the subsequent claims, the term "recycled waste" is used to indicate a material recovered from both post-consumer waste and industrial waste, as opposed to virgin polymers. Post-consumer waste refers to objects having completed at least a first use cycle (or life cycle), i.e. having already served their first purpose; while industrial waste refers to manufacturing scrap, which does not normally reach a consumer.

The term "virgin" denotes the newly produced materials and/or objects prior to their first use, which have not already been recycled.

Many different kinds of polyethylene or polypropylene can be present in "recycled waste". In particular, the polypropylene fraction can comprise: isotactic propylene homopolymers, random copolymers of propylene with ethylene and/or $C_4$-$C_8$ α-olefins, heterophasic copolymers comprising a propylene homopolymer and/or at least one C2, or $C_4$-$C_8$ α-olefin copolymer and an elastomeric fraction comprising copolymers of ethylene with propylene and/or a $C_4$-$C_8$ α-olefin, optionally containing minor amounts of a diene. Examples for the ingredients in the polyethylene fraction are given below.

The term "recycled material" such as used herein denotes materials reprocessed from "recycled waste".

A polymer blend is a mixture of two or more polymeric components. In general, the blend can be prepared by mixing the two or more polymeric components. Suitable mixing procedures known in the art are post-polymerization blending procedures. Post-polymerization blending can be dry blending of polymeric components such as polymer powders and/or compounded polymer pellets or melt blending by melt mixing the polymeric components.

A "compatibilizer" is a substance in polymer chemistry, which is added to an immiscible blend of polymers in order to increase its stability.

"Polyethylene-polypropylene composition" refers to a composition containing both polypropylene and polyethylene.

The polypropylene/polyethylene weight ratio in the blend (A) is in the range of from 7:3 to 3:7.

The term "C2C8 plastomer" denotes a polymer combining qualities of elastomers and plastics and consisting of structural units derived from monomers consisting of ethylene and 1-octene.

If not indicated otherwise "%" refers to weight-%.

In the following, the details and preferred embodiments of the inventive polyolefin composition will be described in more detail. It is to be understood that these technical details and embodiments also apply to the inventive talc filled composition, the inventive article, inventive process and use, as far as applicable.

The compatibilizer (B) suitably has a DSC melting point of equal or below 73° C. The compatibilizer (B) preferably has a DSC melting point of below 60° C. (ISO11357), more preferably 40 to below 60° C., and most preferably 40 to 50° C.

The compatibilizer (B) preferably has an $MFR_2$ (ISO1133, 2.16 kg load at 190° C.) of from 0.1 to below 0.7 g/10 min. Most preferably the compatibilizer (B) has an $MFR_2$ (ISO1133, 2.16 kg load at 190° C.) of from 0.2 to below 0.6 g/10 min.

The compatibilizer (B) preferably has a density of equal or lower than 875 kg/m³ (ISO1183), more preferably equal or lower than 870 kg/m³ (ISO1183). Usually the compatibilizer (B) will have a density of equal or than 850 kg/m³ (ISO1183), The ratio of $MFR_2$ (blend (A) (ISO1133, 2.16 kg load at 230° C.)/$MFR_2$ (compatibilizer (B) (ISO1133, 2.16 kg load at 190° C.) preferably is in the range 6.0 to 15, more preferably 8.0 to 15 and most preferably 10 to 15.

Blend (A) preferably has a content of limonene as determined by using solid phase microextraction (HS-SPME-GC-MS) of from 1 ppm to 100 ppm, preferably from 1 ppm to 50 ppm, more preferably from 2 ppm to 50 ppm, most preferably from 3 ppm to 35 ppm. Depending on the origin of the recycling stream the limonene content will be lower or higher. The limonene content is a strong indicator for the presence of trash from households.

Blend (A) preferably contains
(i) less than 6.0 wt.-% polystyrene; and/or
(ii) contains less than 3 wt.-% talc; and/or
(iii) contains less than 5.0 wt.-% polyamide; and/or
(viii) contains less than 3 wt.-% chalk.

Blend (A) typically contains
(i) less than 0.1 to 6.0 wt.-% polystyrene; and/or
(ii) contains 0.1 to 3 wt.-% talc; and/or
(iii) contains 0.2 to 5.0 wt.-% polyamide; and/or
(viii) contains 0.1 to 3 wt.-% chalk.

DETAILED DESCRIPTION

Figure 1:
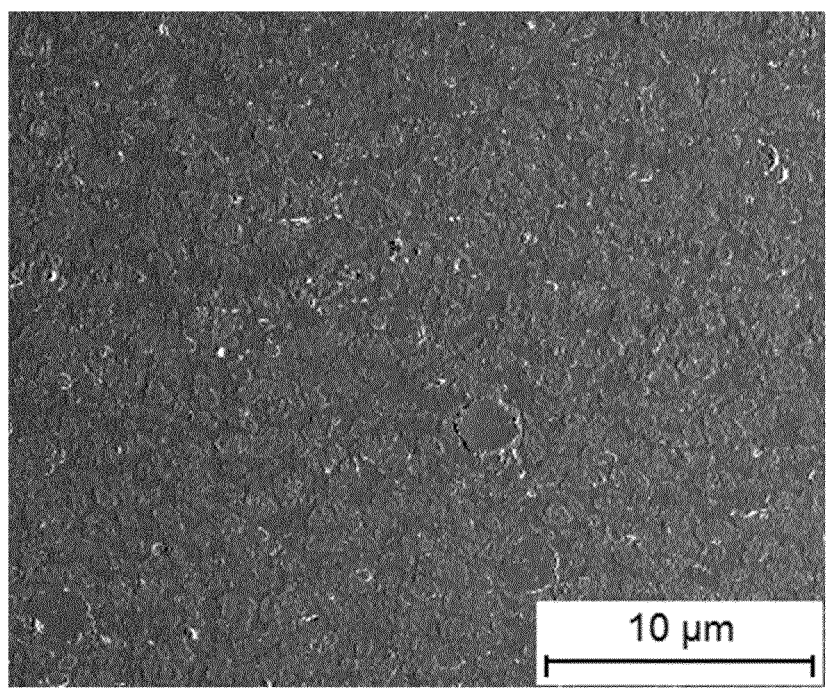
FIG. 1 shows the quality of compatibilization as evaluated using AFM for example IE2c, which had good morphology.

The polyethylene-polypropylene composition according to the present invention comprises from 80 to 97 wt.-% of blend (A). It is the essence of the present invention that blend (A) is obtained from a recycled waste stream. Blend (A) can be either recycled post-consumer waste- or industrial waste, such as for example from the automobile industry, or alternatively, a combination of both.

It is particularly preferred that blend (A) consists of recycled post-consumer waste and/or industrial waste.

Preferably, blend (A) is obtained from recycled waste by means of plastic recycling processes known in the art. Such recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polyethylene rich recycled materials include: DIPOLEN S (Mtm Plastics GmbH), food grade rHDPE (BIFFA PLC) and a range of polyethylene rich materials, such as e.g. HD-LM02041 from PLASgran Ltd.

In a certain preferred embodiment, the recycled polyethylene rich material is DIPOLEN (Mtm Plastics GmbH), such as DIPOLEN S or DIPOLEN H, preferably DIPOLEN H. DIPOLEN is obtained from domestic waste streams (i.e. it is a product of domestic recycling) for example the "yellow bag" recycling system, which operates in some parts of Germany.

Blend (A) may have a relative amount of units derived from ethylene of greater than 20 wt.-%, preferably greater than 27 wt.-%, more preferably greater than 30 wt.-%, still more preferably greater than 35 wt.-%, most preferably greater than 40 wt.-% with respect to the total weight of blend (A).

In addition, blend (A) may have relative amount of units derived from propylene of greater than 40 wt.-%, but less than 65 wt.-%, with respect to the total weight of blend (A).

The polyethylene fraction of the recycled material can comprise recycled high-density polyethylene (rHDPE), recycled medium-density polyethylene (rMDPE), recycled low-density polyethylene (rLDPE) and the mixtures thereof. In a certain embodiment, the recycled material is high density PE with an average density of greater than 0.8 g/cm$^3$, preferably greater than 0.9 g/cm$^3$, most preferably greater than 0.91 g/cm$^3$.

The weight ratio of polypropylene to polyethylene in blend (A) is from 3:7 to 7:3.

According to the present invention, blend (A) preferably has a content of limonene as determined using solid phase microextraction (HS-SPME-GC-MS) of from 1 ppm to 100 ppm, preferably from 1 ppm to 50 ppm, more preferably from 2 ppm to 50 ppm, most preferably from 3 ppm to 35 ppm. Limonene is conventionally found in recycled polyolefin materials and originates from packaging applications in the field of cosmetics, detergents, shampoos and similar products. Therefore, blend (A) contains limonene, when blend (A) contains material that originates from such types of domestic waste streams.

According to the present invention, blend (A) preferably has a content of limonene as determined using solid phase microextraction (HS-SPME-GC-MS) of greater than 0, but less than 200 ppm, preferably less than 100 ppm, more preferably less than 50 ppm, most preferably less than 35 ppm.

The fatty acid content is yet another indication of the recycling origin of blend (A).

Due to the recycling origin blend (A) may also contain:
organic fillers, and/or
inorganic fillers, and/or
additives
in amounts of up to 3 wt.-% with respect to the weight of blend (A).

The talc filled composition according to the present invention preferably consists of 5.0 to 15.0 wt.-% talc and the polyethylene-polypropylene composition as described herein.

The polyethylene-polypropylene composition of the present invention may contain up to 1.0 wt.-% of a stabilizer or a mixture of stabilizers. Preferably stabilizers are contained in an amount of 0.1 to 1.0 wt.-%, based on the total weight of the polyethylene-polypropylene composition. Stabilizers are more described in detail below.

The process according to the present invention for providing a polyethylene-polypropylene composition comprises the steps of:
a) providing blend (A) comprising polypropylene and polyethylene in a ratio of 3:7 to 7:3 in amount of at least 80 wt.-%, based on the total weight of the polyethylene-polypropylene composition,
b) providing a compatibilizer (B) in an amount from 3 to 20 wt.-%, based on the total weight of the polyethylene-polypropylene composition, whereby compatibilizer (B) is a $C_2C_8$ plastomer, having
a DSC melting point of below 75° C. (ISO11357);
an $MFR_2$ (ISO1133, 2.16 kg load at 190° C.) of equal or below 1.5 g/10 min; and
a density of equal or lower than 885 kg/m$^3$ (ISO1183);
wherein the ratio of $MFR_2$ (blend (A) (ISO1133, 2.16 kg load at 230° C.)/$MFR_2$ (compatibilizer (B) (ISO1133, 2.16 kg load at 190° C.), is in the range 3.0 to 15;
c) melting and mixing the blend of blend (A) and the compatibilizer (B) in the presence of 0 to 1.0 wt.-% of a stabilizer or a mixture of stabilizers, and
d) optionally pelletizing.

All preferred aspects and embodiments as described above shall also hold for the process.

Stabilizers are well known in the art and can be for example antioxidants, anti-acids, antiblocking agents, anti-UV's, nucleating agents or antistatic agents.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1, 1'-dimethylbenzyl)diphenylamine), or antioxidant blends.

Anti-acids are also commonly known in the art. Examples are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1);

Common antiblocking agents are natural silica such as diatomaceous earth (such as CAS No. 60676-86-0 (SuperfFloss™), CAS-No. 60676-86-0 (SuperFloss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No.

7631-86-9, CAS-No. 112926-00-8, CAS-No. 7631-86-9, or CAS-No. 7631-86-9), silicates (such as aluminium silicate (Kaolin) CAS-no. 1318-74-7, sodium aluminum silicate CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0).

Anti-UVs are, for example, Bis-(2,2,6,6-tetramethyl-4-piperidyl)-sebacate (CAS-No. 52829-07-9, Tinuvin 770); 2-hydroxy-4-n-° Ctoxy-benzophenone (CAS-No. 1843-05-6, Chimassorb 81).

Nucleating agents like sodium benzoate (CAS No. 532-32-1); 1.3:2,4-bis(3,4-dimethylbenzylidene)sorbitol (CAS 135861-56-2, Millad 3988).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these stabilizers are added in quantities of 100-2.000 ppm for each individual component of the polymer The polyethylene-polypropylene composition preferably contains between 1.0 and 2.0 wt.-% PO ash.

EXPERIMENTAL SECTION

The following Examples are included to demonstrate certain aspects and embodiments of the invention as described in the claims. It should be appreciated by those of skill in the art, however, that the following description is illustrative only and should not be taken in any way as a restriction of the invention.

Test Methods a) The tensile modulus were measured according to ISO 527-2 (cross head speed=1 mm/min; test speed 50 mm/min at 23° C.) using injection moulded specimens as described in EN ISO 1873-2 (dog bone shape, 4 mm thickness). The measurement was done after 96 h conditioning time of the specimen.

b) The impact strength was determined as Charpy Notched Impact Strength according to ISO 179-1 eA at +23° C. on injection moulded specimens of 80×10×4 mm prepared according to EN ISO 1873-2. The measurement was done after 96 h conditioning time of the specimen.

c) Ratio of units derived from C2 and C3: The comonomer contents of the copolymer was determined by quantitative Fourier transform infrared spectroscopy (FTIR) calibrated to results obtained from quantitative 13C NMR spectroscopy.

Thin films were pressed to a thickness of between 300 to 500 µm at 190° C. and spectra recorded in transmission mode. Relevant instrument settings include a spectral window of 5000 to 400 wavenumbers ($cm^{-1}$), a resolution of 2.0 $cm^{-1}$ and 8 scans.

Quantitative $^{13}C\{^{1}H\}$ NMR spectra were recorded in the solution-state using a Bruker Avance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^{1}H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E) The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents. The mole percent comonomer incorporation was calculated from the mole fraction: E [mol %]=100*fE. The weight percent comonomer incorporation was calculated from the mole fraction: E [wt %]=100* (fE*28.06)/((fE*28.06)+((1−fE)*42.08))

d) PE, PS, PA, content: The comonomer content C was determined using a film thickness method using the intensity of the quantitative band I(q) and the thickness of the pressed film T using the following relationship: [ I(q)/T]m+c=C where m and c are the coefficients determined from the calibration curve constructed using the comonomer contents obtained from 13C NMR spectroscopy.

Comonomer content was measured in a known manner based on Fourier transform infrared spectroscopy (FTIR) calibrated with 13C-NMR, using Nicolet Magna 550 IR spectrometer together with Nicolet Omnic FTIR software. Films having a thickness of about 250 µm were compression moulded from the samples. Similar films were made from calibration samples having a known content of the comonomer. The comonomer content was determined from the spectrum from the wave number range of from 1430 to 1100 $cm^{-1}$. The absorbance is measured as the height of the peak by selecting the so-called short or long base line or both. The short base line is drawn in about 1410-1320 $cm^{-1}$ through the minimum points and the long base line about between 1410 and 1220 $cm^{-1}$. Calibrations need to be done specifically for each base line type. Also, the comonomer content of the unknown sample needs to be within the range of the comonomer contents of the calibration samples.

Talc and chalk content: measured by Thermogravimetric Analysis (TGA); experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO2) was assigned to CO2 evolving from CaCO3, and therefore the chalk content was evaluated as:

Chalk content=100/44×WCO2

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

Ash content=(Ash residue)−56/44×WCO2−Wcb

Where Ash residue is the weight % measured at 900° C. in the first step conducted under nitrogen. The ash content is estimated to be the same as the talc content for the investigated recyclates.

e) MFR: melt flow rates were measured with a load of 2.16 kg ($MFR_2$) at 230° C. or 190° C. as indicated. The melt flow rate is that quantity of polymer in grams which the test apparatus standardized to ISO 1133 extrudes within 10 minutes at a temperature of 230° C. (or 190° C.) under a load of 2.16 kg.

f) DSC melting point (ISO 11357)
g) Density (ISO 1183)
h) Morphology
by AFM

EXPERIMENTS

A number of blends were produced with DIPOLEN S as blend (A), a polyethylene-polypropylene blend from Mtm Plastics GmbH, materials according to the August 2018 specifications.

In each of the blends 5 to 20 wt.-% of a reactor-derived compatibilizer (B) was added. As compatibilizer (B) the following commercially available plastomers were used:
Queo8201 (inventive IE1 a-c)
Queo6800 (inventive IE2 a-c)
Infuse9077 (comparative C1a,b)
IntuneD5535 (comparative C2a,b)
Exact8203 (comparative C3 a-c)
Queo7007 (comparative C4 a-c)
Queo8207 (comparative C5 a-c)

The compositions were prepared via melt blending on a co-rotating twin screw extruder with 0.3 wt.-% Irganox B225F as stabilizer.

The polymer melt mixture was discharged and pelletized. For testing the mechanical properties, specimens were produced and tested according to ISO 179 with 1eA notched specimens to measure the Charpy notched impact strength and according to ISO 527-1/2 with 1A specimens to measure the tensile properties at room temperature.

Limonene Content in DIPOLEN
Measurement

Limonene quantification was carried out using solid phase microextraction (HS-SPME-GC-MS) by standard addition.

50 mg ground samples were weighed into 20 mL headspace vials and after the addition of limonene in different concentrations and a glass-coated magnetic stir bar, the vial was closed with a magnetic cap lined with silicone/PTFE. Micro capillaries (10 pL) were used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6 mg/kg, 11 mg/kg and 16.5 mg/kg limonene were used in combination with some of the samples tested in this application. For quantification, ion-93 acquired in SIM mode was used. Enrichment of the volatile fraction was carried out by headspace solid phase microextraction with a 2 cm stable flex 50/30 pm DVB/Carboxen/PDMS fibre at 60° C. for 20 minutes. Desorption was carried out directly in the heated injection port of a GCMS system at 270° C.

GCMS Parameters:
Column: 30 m HP 5 MS 0.25*0.25
Injector: Splitless with 0.75 mm SPME Liner, 270° C.
Temperature program: −10° C. (1 min)
Carrier gas: Helium 5.0, 31 cm/s linear velocity, constant flow
MS: Single quadrupole, direct interface, 280° C. interface temperature
Acquisition: SIM scan mode
Scan parameter: 20-300 amu
SIM Parameter: m/Z 93, 100 ms dwell time

TABLE 1

| Limonene content in DIPOLEN (Blend (A)) | |
|---|---|
| Sample | Limonen [mg/kg] HS-SPME-GC-MS[1] |
| Dipolen S | 31.5 ± 2.6 |

[1]Headspace Soldiphase Microextraction. Materials available from mtm plastics GmbH, according to 2018 specifications.

Total Free Fatty Acid Content

Fatty acid quantification was carried out using headspace solid phase micro-extraction (HS-SPME-GC-MS) by standard addition.

50 mg ground samples were weighed in 20 mL headspace vial and after the addition of limonene in different concentrations and a glass coated magnetic stir bar the vial was closed with a magnetic cap lined with silicone/PTFE. 10 µL Micro-capillaries were used to add diluted free fatty acid mix (acetic acid, propionic acid, butyric acid, pentanoic acid, hexanoic acid and octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode was used for all acids except propanoic acid, here ion 74 was used.

GCMS Parameter:
Column: 20 m ZB Wax plus 0.25*0.25
Injector: Split 5:1 with glass lined split liner, 250° C.
Temperature program: 40° C. (1 min) @6° C./min to 120° C., @15° C. to 245° C. (5 min)
Carrier: Helium 5.0, 40 cm/s linear velocity, constant flow
MS: Single quadrupole, direct interface, 220° C. inter face temperature
Acquisition: SIM scan mode
Scan parameter: 46-250 amu 6.6 scans/s
SIM Parameter: m/z 60, 74, 6.6 scans/s

TABLE 2

| Total fatty acid content in Dipolen (Blend (A)) | |
|---|---|
| Sample | Total fatty acid concentration [mg/kg][1] |
| Dipolen S | 70.6 |

[1]The concentration of acetic acid, propionic acid, butyric acid, pentanoic acid, hexanoic acid octanoic acid, nonanoic acid and decanoic acid in each sample was added together to give a totally fatty acid concentration value.

TABLE 5

Results

| | Ref1 | IE1a | IE1b | IE1c | IE2a | IE2b | IE2c | C1a | C1b | C2a | C2b |
|---|---|---|---|---|---|---|---|---|---|---|---|
| Blend (A) | | | | | Dipolen S | | | | | | |
| (B) | | | Queo8201 | | | Queo6800 | | Infuse9077 | | Intune D5535 | |
| - Block copo nature (B) | | | no | | | no | | yes | | yes | |
| Wt.-% (A) vs. (A) + (B) | 100 | 95 | 90 | 80 | 95 | 90 | 80 | 95 | 90 | 95 | 90 |
| Wt. % (B) | 0 | 5 | 10 | 20 | 5 | 10 | 20 | 5 | 10 | 5 | 10 |
| Tm(DSC) ° C. of (B) | | | 73 | | | 47 | | 118 | | (90) | |
| MFR2(B) | | | 1.1 | | | 0.5 | | 0.5 | | 4 | |
| Density (B) kg/m³ | | | 883 | | | 868 | | 869 | | nd | |
| MFR (A)/ MFR (B) | — | | 5.2 | | | 11.5 | | 11.5 | | 1.4 | |
| melt modulus (RT, ISO 527-2), MPa | 849 | 807 | 727 | 607 | 773 | 670 | 522 | 744 | 656 | 806 | 747 |
| Charpy ISO 179 notched RT | 5.5 | 6.8 | 10.7 | 45.2 | 9.0 | 30 | 65 | 8.4 | 31 | 5.8 | 7.1 |
| MFR(total) (A) + (B)/Total comp wt.-% | 5.7 | 5.5 | 5.1 | 4.8 | 5.2 | 4.9 99.7 | 4.3 | 5.4 | 4.8 | 5.9 | 5.9 |
| IrganoxB225F wt.-% | | | | | | 0.3 | | | | | |

| | C3a | C3b | C3c | C4a | C4b | C4c | C5a | C5b | C5c |
|---|---|---|---|---|---|---|---|---|---|
| Blend (A) | | | | | Dipolen S | | | | |
| (B) | | Exact8203 | | | Queo7007 | | | Queo8207 | |
| - Block copo nature (B) | | no | | | no | | | no | |
| Wt.-% (A) vs. (A) + (B) | 95 | 90 | 80 | 95 | 90 | 80 | 95 | 90 | 80 |
| Wt. % (B) | 5 | 10 | 20 | 5 | 10 | 20 | 5 | 10 | 20 |
| Tm(DSC) ° C. of (B) | | 72 | | | 48 | | | 75 | |
| MFR2(B) | | 3.0 | | | 6.6 | | | 6.6 | |
| Density (B) kg/m³ | | 882 | | | 870 | | | 883 | |
| MFR (A)/ MFR (B) | | 1.9 | | | 0.9 | | | 0.9 | |
| melt modulus (RT, ISO 527-2), MPa | 773 | 744 | 581 | 769 | 680 | 675 | 798 | 745 | 602 |
| Charpy ISO 179 notched RT | 7.6 | 8.4 | 41 | 6.7 | 11 | nd | 6.4 | 8.2 | 30.2 |
| MFR(total) (A) + (B)/Total comp wt.-% | 5.7 | 5.7 | 5.6 | 5.8 | 6.2 99.7 | 6.1 | 5.9 | 6.2 | 6.8 |
| IrganoxB225F wt.-% | | | | | 0.3 | | | | |

It can be seen particularly from examples IE2a to IE2c that a conventional C2C8 plastomer having a DSC melting point of below 75° C. (ISO11357); an MFR₂ (ISO1133, 2.16 kg load at 190° C.) of equal or below 1.5 g/10 min; and a density of equal or lower than 885 kg/m³ (ISO1183) without block copolymer structure is surprisingly sufficient for achieving the same or even better (IE2a, b vs. C2a, b) impact and practically the same or slightly better stiffness (at 5 wt.-%; IE2a vs. C1a) as obtainable by a plastomers having block copolymer nature. It further can be seen (from C3a-c) that MFR₂ (ISO1133, 2.16 kg load at 190° C.) of the compatibilizer (B) definitely should be lower than 3.0 g/10 min in order to achieve good impact. In yet a further aspect, it can be seen (from C2a,b) block copolymer nature of compatibilizer (B) cannot guarantee good impact properties.

Figure 2:
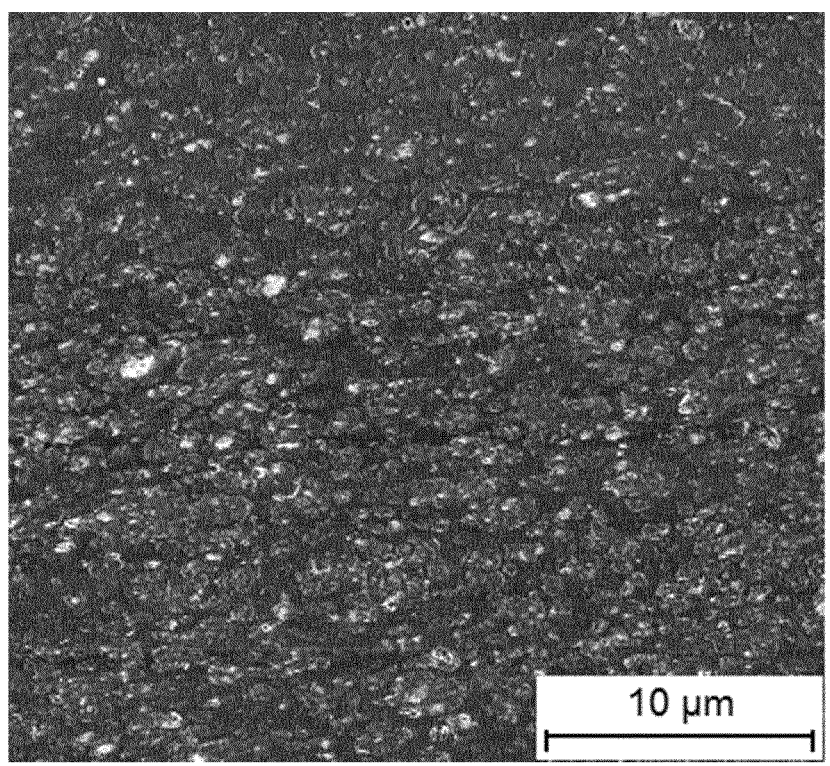
FIG. 2 shows the quality of compatibilization as evaluated by AFM for comparative example C3c, which had coarse, undesirable morphology.

The quality of compatibilization was further evaluated by AFM. FIG. 1 (example IE2c) verified good morphology, whereas FIG. 2 (comparative example C3c) proved coarse, undesirable morphology.

The invention claimed is:

1. A polyethylene-polypropylene composition obtainable by blending:
   a) 80 to 97 wt. % of a blend (A) comprising:
      A-1) polypropylene and
      A-2) polyethylene,
      wherein the weight ratio of polypropylene to polyethylene is from 3:7 to 7:3, and
      wherein blend (A) is a recycled material, which is recovered from a waste plastic material derived from post-consumer and/or industrial waste; and wherein blend (A) contains one or more of:
i) limonene as determined by using solid phase microextraction (HS-SPME-GC-MS) of greater than 0 ppm to less than 200 ppm,
ii) less than 6.0 wt. % polystyrene,
iii) less than 3 wt. % talc,
iv) less than 5.0 wt. % polyamide, and
v) less than 3 wt. % chalk;
b) 3 to 20 wt. % of a compatibilizer (B) being a $C_2C_8$ plastomer, having:
a DSC melting point of 40 to 50° C. (ISO11357);
an $MFR_2$ (ISO1133, 2.16 kg load at 190° C.) of equal or below 1.5 g/10 min; and
a density of equal or lower than 885 kg/m$^3$ (ISO1183),
wherein the ratio of $MFR_2$ (blend (A) (ISO1133, 2.16 kg load at 230° C.)/$MFR_2$ (compatibilizer (B) (ISO1133, 2.16 kg load at 190° C.), is in the range 3.0 to 15; and
c) 0 to 1.0 wt. % of a stabilizer or mixture of stabilizers.

2. The polyethylene-polypropylene composition according to claim 1, wherein the compatibilizer (B) has an $MFR_2$ (ISO1133, 2.16 kg load at 190° C.) of below 0.7 g/10 min.

3. The polyethylene-polypropylene composition according to claim 1, wherein the compatibilizer (B) has a density of equal or lower than 875 kg/m$^3$ (ISO1183).

4. The polyethylene-polypropylene composition according to claim 1, wherein the ratio of $MFR_2$ (blend (A) (ISO1133, 2.16 kg load at 230° C.)/$MFR_2$ (compatibilizer (B) (ISO1133, 2.16 kg load at 190° C.), is in the range 6.0 to 15.

5. The polyethylene-polypropylene composition according to claim 1, whereby blend (A) has a content of limonene as determined by using solid phase microextraction (HS-SPME-GC-MS) of from 1 ppm to 100 ppm.

6. The polyethylene-polypropylene composition according to claim 1, whereby blend (A) has a relative amount of units derived from ethylene of greater than 20 wt. % with respect to the total weight of blend (A).

7. A talc filled composition consisting of 0.1 to 20.0 wt. % talc and the polyethylene-polypropylene composition according to claim 1.

8. An article comprising the polyethylene-polypropylene composition claim 1.

9. A process for providing a polyethylene-polypropylene composition according to claim 1, the process comprising the steps of:
a) providing blend (A) comprising polypropylene and polyethylene in a ratio of 3:7 to 7:3 in amount of at least 80 wt. %, based on the total weight of the polyethylene-polypropylene composition,
b) providing a compatibilizer (B) in an amount from 3 to 20 wt. %, based on the total weight of the polyethylene-polypropylene composition, whereby compatibilizer (B) is a $C_2C_8$ plastomer, having:
a DSC melting point of 40 to 50° C. (ISO11357);
an $MFR_2$ (ISO1133, 2.16 kg load at 190° C.) of equal or below 1.5 g/10 min; and
a density of equal or lower than 885 kg/m$^3$ (ISO1183);
wherein the ratio of $MFR_2$ (blend (A) (ISO1133, 2.16 kg load at 230° C.)/$MFR_2$ (compatibilizer (B) (ISO1133, 2.16 kg load at 190° C.), is in the range 3.0 to 15;
c) melting and mixing the blend of blend (A) and the compatibilizer (B) in the presence of 0 to 1.0 wt. % of a stabilizer or a mixture of stabilizers, and
d) optionally pelletizing.

10. An article comprising a talc filled composition consisting of 0.1 to 20.0 wt. % talc and the polyethylene-polypropylene composition according to claim 1.

* * * * *